United States Patent [19]

Johnson

[11] Patent Number: 5,327,567
[45] Date of Patent: Jul. 5, 1994

[54] METHOD AND SYSTEM FOR RETURNING EMULATED RESULTS FROM A TRAP HANDLER

[75] Inventor: Douglas A. Johnson, Carrollton, Tex.

[73] Assignee: Texas Instruments Incorporated, Dallas, Tex.

[21] Appl. No.: 855,137

[22] Filed: Mar. 19, 1992

Related U.S. Application Data

[63] Continuation of Ser. No. 437,723, Nov. 16, 1989, abandoned.

[51] Int. Cl.$^5$ ................................................ G06F 9/00
[52] U.S. Cl. ................................ 395/775; 395/500; 364/261.6; 364/247; 364/247.4; 364/262.4; 364/DIG. 1
[58] Field of Search .............. 364/DIG. 1, DIG. 2; 395/775, 375, 500, 425; 371/12

[56] References Cited

U.S. PATENT DOCUMENTS

| | | | |
|---|---|---|---|
| 4,074,353 | 2/1978 | Woods et al. | 364/200 |
| 4,080,650 | 3/1978 | Backett | 364/200 |
| 4,649,478 | 3/1987 | Worley, Jr. | 364/200 |
| 4,719,565 | 1/1988 | Moller | 364/200 |
| 4,742,449 | 5/1988 | Epstein et al. | 364/200 |
| 4,763,242 | 8/1988 | Lee et al. | 364/200 |
| 4,866,665 | 9/1989 | Haswell-Smith | 364/900 |
| 4,890,221 | 12/1989 | Gage | 364/200 |
| 4,942,524 | 7/1990 | Nunomura | 364/200 |
| 4,961,161 | 10/1990 | Kojima | 364/736.5 |
| 4,967,375 | 10/1990 | Pelham et al. | 364/518 |
| 5,012,403 | 4/1991 | Keller et al. | 364/200 |

Primary Examiner—Gopal C. Ray
Attorney, Agent, or Firm—W. Daniel Swayze, Jr.; Leo N. Heiting; Richard L. Donaldson

[57] ABSTRACT

A trap handler return for returning emulated results from a trap handler in a data processor includes source and destination register sets, and circuitry for transferring a specified value from the source register set to the destination register set. The trap handler return includes an instruction for returning the emulated result from the source register set to the destination register set. That instruction may be executed in the delay slot of an instruction which causes the transfer of control from the trap handler to the routine which caused the trap.

13 Claims, 3 Drawing Sheets

METHOD AND SYSTEM FOR RETURNING EMULATED RESULTS FROM A TRAP HANDLER

This application is a continuation of application Ser. No. 07/437,723, filed Nov. 16, 1989, now abandoned.

FIELD OF THE INVENTION

The present invention relates to methods and apparatus for trap handling in computer systems. Cofiled application Ser. No. 07/438,386 (TI-13908) filed Nov. 16, 1989 which is the parent application to application Ser. No. 07/871,594 filed Apr. 16, 1992, is hereby incorporated herein by reference as if fully set forth.

BACKGROUND OF THE INVENTION

Reduced Instruction Set Computer (RISC) architecture focuses on the features needed to support static languages, particularly C. Static languages have data types which are known at compile time, and any runtime storage management is done explicitly by the programmer. Dynamic languages, such as Smalltalk and LISP, have data types which may not be known until runtime, and storage management, i.e. garbage collection, is done implicitly. The distinctions between static and dynamic languages become blurred as enhanced static languages, such as C++, acquire more characteristics of dynamic languages.

RISC architectures are well suited to the majority of dynamic language operations. Both LISP and Smalltalk are dominated by data movement, function calling and integer arithmetic. Typical RISC architectures are optimized for those operations. Dynamic languages, however, require support for possibilities rather than the probabilities supported in static languages. For example, any given arithmetic operation in a dynamic language probably will have simple integer operands, but those operands may be any type. As a general rule, one does not know the types of operands at compile time in dynamic languages, therefore it is necessary to do extensive checking at runtime which can be expensive both in terms of time and code space.

Data movement in dynamic languages presents similar problems. An incremental garbage collection system utilizes a read barrier that is checked on every fetch from heap storage. Generational garbage collectors use a write barrier that is checked with every store onto the heap. The cost of inline code for a read barrier to implement incremental garbage collection on conventional processors has proven to be prohibitive. Inline checks are used for write barriers on conventional processors because store operations are generally much less frequent than read operations, on such processors but the checks required still cause significant performance degradation.

LISP machines use extensive special hardware and microcode to do checking and special case handling. RISC processors do not have microcode and basic RISC philosophy dictates that a careful evaluation of the cost of special hardware be undertaken before adding such hardware. Therefore, efficient implementation of trap handlers in LISP and other dynamic languages running on RISC processors requires different strategies than the approaches used on LISP machines.

One approach uses relatively small amounts of special additional hardware to detect "unusual" conditions and then traps to a handler for those conditions. While this seems to be an effective approach, it burdens the trap handling architecture of existing RISC systems beyond their design limits, and often results in inadequate performance characteristics, such as unacceptably reduced program execution speed.

Trap architectures for dynamic language systems have requirements that are significantly different than those for more conventional systems. The trap handler must be able to emulate some operation that is not directly supported by the system hardware. Trap handlers need to interface with garbage collectors and dynamic language level handlers. This means the trap handler must have ready access to the dynamic language environment.

Additionally the trap handler cannot accept some restrictions that are often placed on trap handlers. For example, a dynamic language trap handler must reference arbitrary objects in the language environment, which means it must be able to tolerate page faults, i.e. the trap handler must also be able to trap.

Since dynamic language traps occur at a much greater frequency than traditional system traps, the trap architecture must minimize the software runtime to get to the trap handler, determine what must be done, and do it.

Current trap architectures on conventional processors are not designed for handling the traps of a dynamic language. They are intended to handle errors, such as address faults, or conditions requiring large amounts of processing, such as page faults. Conventional trap architectures are inadequate for use with dynamic languages for three main reasons. First, all traps in conventional machines enter the kernel mode, so the user has little or no control over how the trap is handled. Second, there is insufficient support in conventional architectures for rapid trap execution. Third, conventional trap handlers cannot tolerate traps themselves.

Most existing trap architectures expect the kernel to handle all traps. The kernel is not the most efficient level for implementation of dynamic language trap handlers. The kernel is both over privileged and under privileged for this purpose. It is over privileged in the sense that it generally can perform operations users cannot, such as accessing protected memory. If the trap handler is emulating a user instruction, it needs to do so with the same access rights as the user program. The kernel is under privileged because trap handlers usually run at low levels within the kernel and often do not have access to higher level functions such as file systems or communications.

Additionally, different dynamic languages need different trap handlers. They have different encoding schemes, different data types, different semantics, and different garbage collectors. The kernel needs a different set of handlers for each implementation of each language and must switch handlers with each process change.

On another level, kernel, or system trap handlers, cause problems unless all the dynamic languages and the kernel are written and maintained by the same manufacturer. Kernel vendors are reluctant to put "strange" code into the kernel portion of their systems. Even then, the coordination of kernel changes with all the dynamic language changes seems quite overwhelming and impractical.

Some RISC architecture machines provide a much more flexible mechanism for handling traps. In these systems, a user program can "register" trap handlers with the kernel that will be used when a particular trap occurs. These tag trap handlers as they are sometimes called, are part of the user program and run in user mode. The kernel calls the registered tag trap handler after a trap occurs, passing information such as the decoded trapping instruction and its operands to the trap handler. When returning, the tag trap handler can return results as if it came from the trapping instruction, or it can cause the instruction to be re-executed.

This approach eliminates many of the functional difficulties associated with kernel resident trap handlers. Unfortunately, it does not adequately deal with performance problems. In fact, the additional interface requirements employed with tag trap handlers tend to aggravate the performance problems associated with dynamic language trap handling.

SUMMARY OF THE INVENTION

One object of the present invention is to provide a method and apparatus for improved trap handling in computer systems.

Another object of the present invention is to provide a method and apparatus for distinguishing between traps that are handled by the computer system and those that are more efficiently handled by the user.

It is another object of the present invention to provide a method and apparatus for improved trap handling without excessive additional hardware or code.

Another object of the present invention is to provide a method and apparatus for trap handling in a computer using dynamic languages.

Other objects of the present invention are to provide a method and apparatus for trap handling which gives the user program control over certain traps, eliminates undue restrictions on code within trap handlers, provides information about the trap to the handler; and allows the handler to return a result as if it had come from the trapping instruction.

The trap handler of the present invention includes means for segregating system traps from user traps. System traps have priority over user traps. If both occur during execution of an instruction, the system trap will be handled and the user trap ignored. Re-execution of the instruction after the system trap is handled will again generate the user trap for further handling if the user trap is still present.

The current register window pointer is incremented, the program counter (PC) and Next program counter (Next PC) are stored in the new window, user traps are disabled, and execution continues at the proper location in the user trap vector. The processor remains in user mode. Additionally, information about the trapping instruction and its operands are written to user accessible special registers.

System traps use the system window and do not generate a window overflow trap. They trap to the system trap PC, disable system traps, and put the processor into a supervisory state. The trap instruction information is not written to the special registers thereby allowing system traps to occur transparently, even in user trap handlers.

DETAILED DESCRIPTION OF THE PREFERRED EMBODIMENT

Since certain traps are most efficiently handled by the user program, traps are divided into user and system groups of traps.

SYSTEM TRAPS

Reset
Error
Interrupt
Page Fault
Protection Violation
Window Overflow and Underflow
Illegal or Privileged Instruction
Half of the Trap Codes for a Trap Instruction

USER TRAPS

Figure 1:
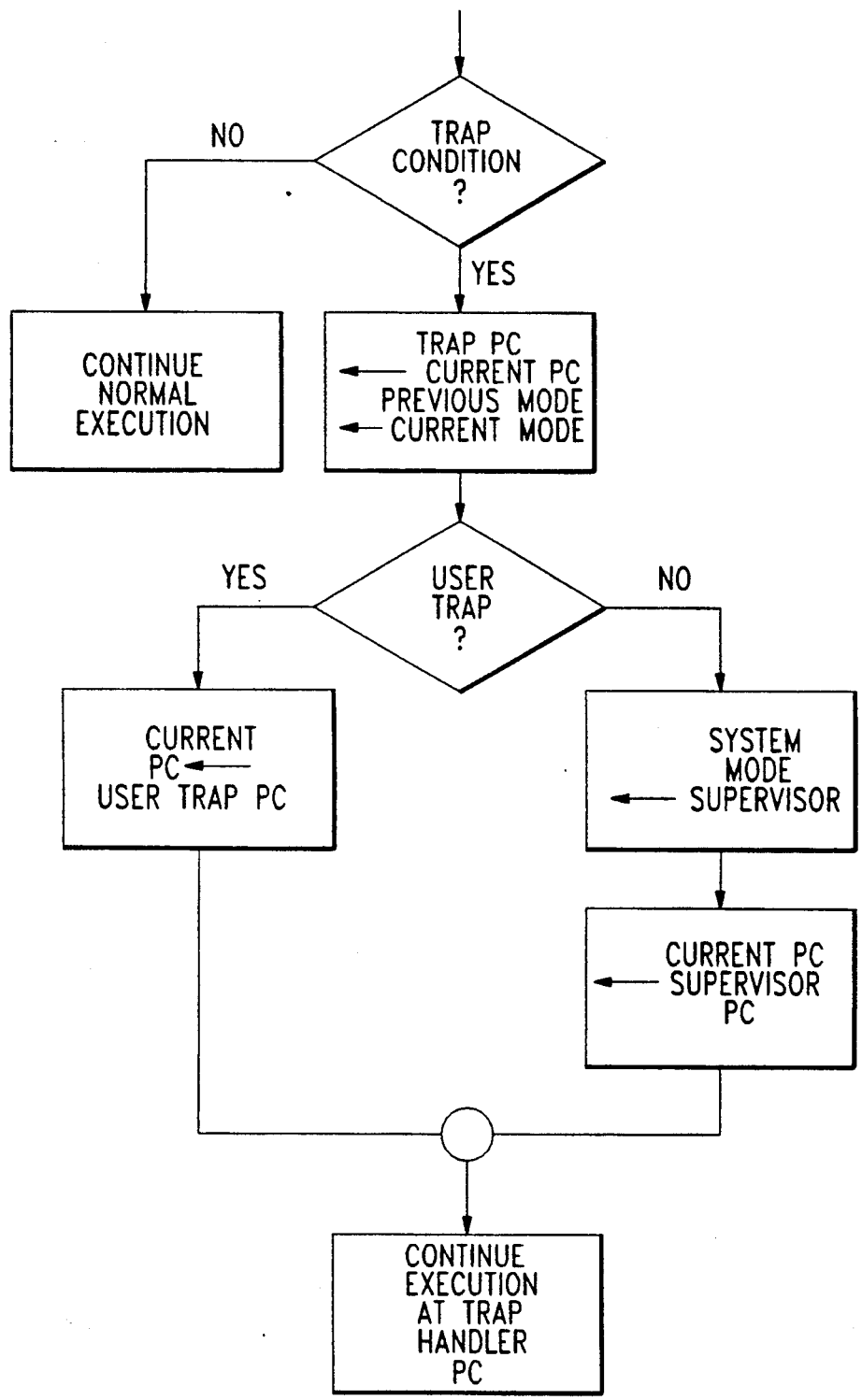
FIG. 1 is a flow chart showing of the method of the present invention.

Tag Trap
Overflow
GC Trap (Read and Write Barrier Faults)
Unaligned Address Trap
Half of the Trap Codes for a Trap Instruction Referring now to FIG. 1, the flow chart illustrates the method of the present invention. If a trap condition exists, the program counter PC is trapped and loaded into the current PC. The previous mode is set to the current mode, and the type of trap is determined by vectoring through the appropriate trap table as previously described. If the trap is a system trap, the system trap PC is loaded into the PC, the machine enters the system protection mode and supervisor state where the trap is handled in a known manner. When the trap handling is complete, execution of the main program continues at the current PC.

If the trap is a user trap, protection mode does not change and the user trap PC is loaded into the PC. The trap information is loaded into the special trap registers OPCODE, OP1, OP2 AND DEST as previously discussed. Upon completion of user trap handling, program execution continues at the current PC. It can be seen that user traps are handled while the machine is in the user mode. There is no need to exit the user mode and enter the system mode for trap handling, and then return to the user mode to resume normal program execution upon completion of trap handling. The result is a significant savings of program code and execution time.

The present invention gives the user program control over certain traps, eliminates undue restrictions on code with trap handlers, provides information about the trap to the handler, and allows the trap handler to return a result as if it had come from the trapping instruction.

In accordance with the present invention, traps are divided into two groups of system and user traps. The system traps include: reset, error, interrupt, page fault and protection violation, window overflow and underflow, illegal or privileged instruction, and approximately half the trap codes for a trap instruction. These essentially are the traditional traps.

The user traps include: tag trap, overflow, GC trap (read and write barrier faults), unaligned address trap, and approximately the other half of the trap codes for a trap instruction. These essentially are the traps added for dynamic language support.

The system traps vector to the system PC and have priority over user traps. If both occur during execution of an instruction, the system trap will be handled and the user trap will be ignored. Re-execution of the instruction after the system trap is handled will generate the user trap if the user trap condition is still present.

System traps use the system window and do not generate a window overflow trap. They vector through the system trap table, disable system traps, and put the processor into a supervisor mode or state. The system trap instruction information is not written to the special registers as it is with user traps, thereby allowing system traps to occur transparently to the user, even in user trap handlers.

User traps trap to the user trap PC in the user's address space indicated by a special register, the User Trap Register (UTR), which can be addressed and modified by the user. A user trap can be viewed as a forced subroutine call. The current register window pointer is incremented, the PC and Next PC are stored in the new window, user traps are disabled, and execution continues at the proper location in the user trap vector. The processor remains in user mode. Additionally, information about the trapping instruction and its operands are written to user acccessible special registers as follows:

| REGISTER | CONTENTS |
| --- | --- |
| OPCODE | Opcode of the trapping instruction |
| OP1 | Value of the first source operand of the trapping instruction |
| OP2 | Value of the second source operand of the trapping instruction |
| DEST | Register number of the destination register of the trapping instruction |

These registers are loaded with the appropriate values when a user trap occurs. System traps do not modify these registers. If they were modified by a system trap, system traps could not be tolerated in user trap handlers. While a comparable set of registers would be useful for system traps their presence probably is not justified due to the less frequent occurrence of system traps.

The purpose of disabling user traps is to preserve the information contained in the special registers until the registers can be read by the trap handler. Preferably each user trap handler copies these special registers to general registers in the user trap handler's window, so at that point user traps may be re-enabled.

The user trap handler does one of two things on return to normal program execution. If the handler has corrected the condition causing the trap, the trapping instruction will be re-executed as if the trap had not occurred. This is similar to the operation of system trap handlers when certain traps, such as virtual memory faults, occur. Most trap handling architectures provide good support for this type of trap return.

Figure 4:
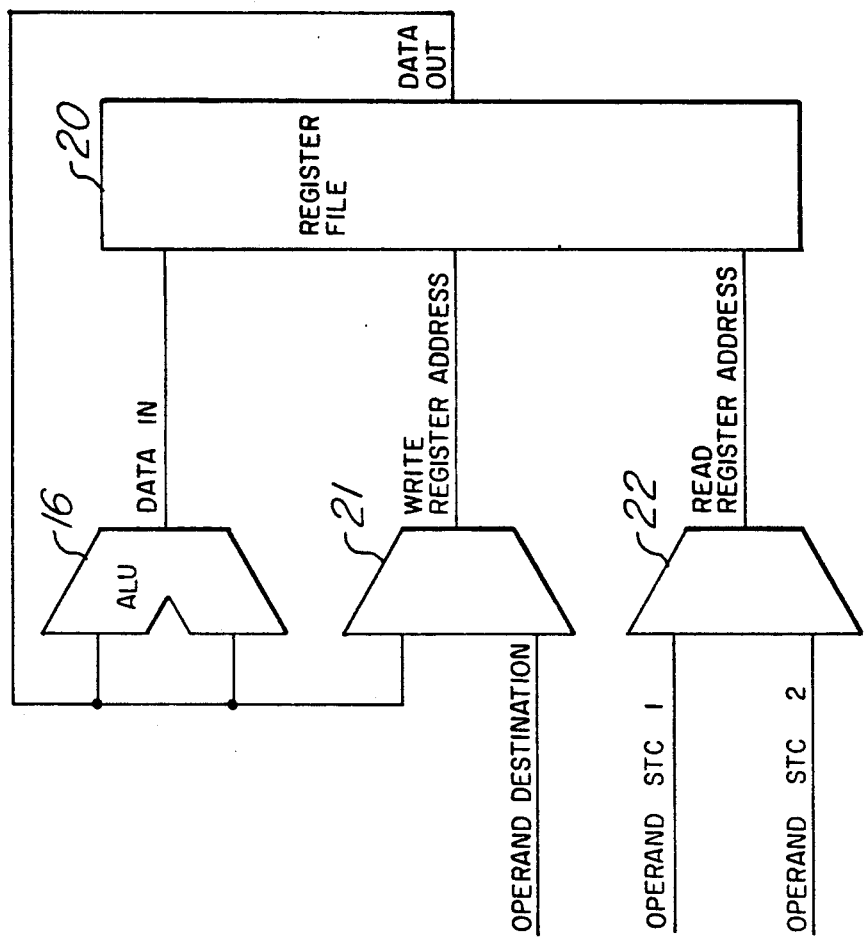
FIG. 4 is a block diagram of the trap return of the preferred embodiment.
Figure 3:
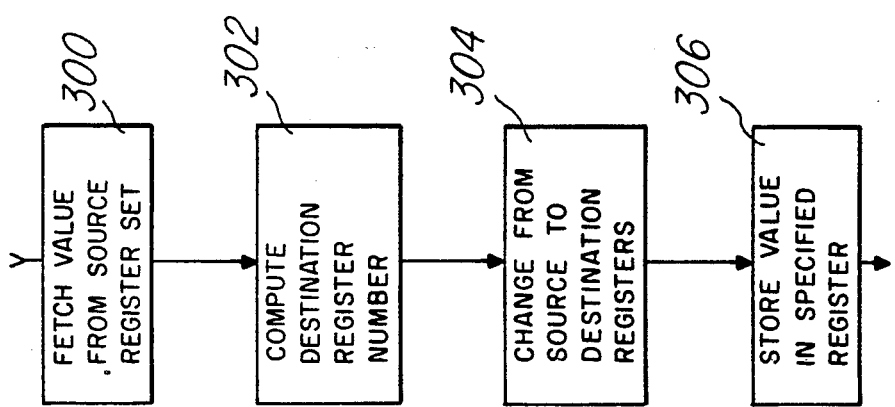
FIG. 3 is a flow chart of the trap return of the preferred embodiment.

If the handler has emulated the trapping instruction, a value must be returned as if it had come from the trapping instruction and execution continued with the next instruction. Computer architectures generally do not provide good support for instruction emulation by a trap handler. As shown in FIGS. 3 and 4, the emulated result is loaded into the destination register of the trapping instruction, and any condition codes are appropriately set for continued program execution.

Figure 2:
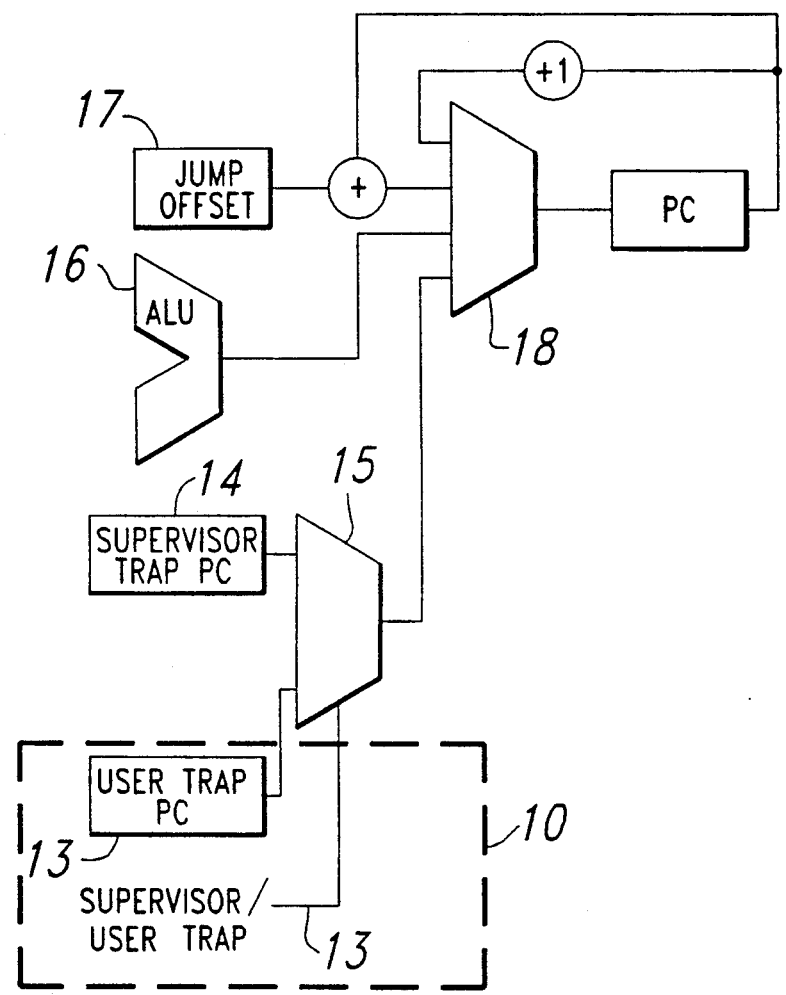
FIG. 2 is a block diagram of the present invention.

FIG. 2 shows the additional logic circuitry 10 employed in the preferred embodiment of the present invention. The foregoing trap handling method can be implemented using a user trap PC 12 and a supervisor/user trap control line 13 which are multiplexed with the existing system or supervisor trap PC 14 via MUX 15. It should be apparent that the present invention requires the addition of only a minimal amount of logic cicuitry 10 to the already existing machine trap and interrupt circuitry.

The present invention, for example, could be implemented on a SPUR computer having a RISC architecture manufactured by the University of California. The SPUR machine would be modified to partition its trap vector into user and sytem trap vectors as previously discussed. The user readable registers OPCODE, OP1, OP2 and DEST would be added, and an instruction is added to return an emulated result from the trap handler.

The instruction VALUE_RETURN is defined as taking two arguments. The value to be returned and the number of the register to which the return is made. As shown in FIG. 3, the instruction reads the return value (Step 300) and the destination register number (DEST) out of the current register window (Step 302), moves the window pointer to the previous window (Step 304), and stores the return value in the proper destination register (Step 306). The present invention can be implemented with minor extensions to the existing SPUR data paths. Those extensions are shown in FIG. 4. As indicated there is a modification to the RISC architecture data path to implement the VALUE_RETURN instruction. It involves multiplexor 21 in the write register selector. Multiplexor 21 muxes operated destination and data from register file 20.

The fifty-nine instructions SPUR normally needs to return an emulated result would be reduced to two as follows:

/* The trap handler is now executing in the register window immediately below the trapping instruction's window. Register values are:
NEXT_PC_REG—the address of the next instruction to be executed
DEST_REG—the number of the destination register of the trapping instruction p1 RESULT_REG—the value to be returned

```
*/
/*Go back to user program */
jump_reg        NEXT_PC_REG
value_return    DEST_REG,RESULT_REG
/* In delay slot, return value */
```

The JUMP_REG instruction continues the user program at the next instruction after the trapping instruction. The VALUE_RETURN instruction executes in the delay slot of the jump and returns the emulated result and restores the current window pointer.

These modifications to the SPUR machine have a significant impact on performance. The 188 instructions used in the SPUR's tag trap handler are reduced to nine as follows:

```
/* Get trap information */
rd_special opcode, OPCODE_REG
rd_special op1, OP1_REG
rd_special op2, OP2_REG
```

```
                -continued
    rd_special dest,DEST_REG
    /* Enable user traps */
    rd_special upsw,TMP_REG
    or TMP_REG,TMP_REG,UTRAP_ENABLE
    wr_special upsw,TMP_REG
    /* Begin trap handler */
        .
        .
        .
    /* Go back to user program */
    jump_reg NEXT_PC_REG
    value_return DEST_REG,RESULT_REG
```

The hardware needed to implement the present invention on SPUR is minimal. The user trap PC requires an additional register, the UTR, to hold the user trap PC. This can be implemented in parallel with the existing system Trap PC register used for the system traps. When a trap occurs, the proper register is selected based on whether the trap is a system or user trap.

A user trap enable bit 13 is added to the existing User Processor Status Word register (UPSW), not shown, to control whether user traps are taken or not. The user trap enable bit 13 also controls the updating of the user trap registers. In the embodiment shown, if the bit 13 is not set, the user trap registers are not changed because a system trap occurred.

The user trap registers are extensions to the existing SPUR special registers. Op1 and Op2 are located in front of the ALU 16 inputs and are loaded during the execute pipe stage. The information necessary for the Opcode and Dest registers is not readily available, so two sets of temporary latches are added to transmit the data through intermediate stages to the execute phase when traps occur.

The VALUE_RETURN instruction requires a fourth input, Jump Offset 17 added to the MUX 18 that selects the register to be modified, thereby allowing the register number to be a data value rather than an immediate operand in the instruction.

The changes made to implement the present invention on a SPUR machine have no effect on the critical path of the CPU. There is only a minor impact on the area and gate counts. The changes required add approximately 1.4% to the computer chip.

The present invention also may be implemented on a SPARC machine with changes very similar to those on the SPUR machine. The trap vector is partitioned into system and user trap vectors. The instruction decode registers are added. User programs directly modify the integer condition codes. In the SPARC implementation it is not necessary to add the VALUE_RETURN instruction since SPARC machines have the RESTORE instruction which can be used to perform the same function, although it requires slightly more trap handler code as set forth below.

SPARC has unique opcodes for reading and writing each special register. RDPSR and WRPSR respectively read and write the processor status register while RDTBR and WRTBR read and write the trap base register respectively. Accordingly, ten new instructions are added to read and write the five new registers. Alternatively, the RD_SPECIAL and WR_SPECIAL instructions of SPUR can be utilized with SPARC employing an immediate operand to specify the special register to be read or written, thereby reducing the considerable opcode space otherwise used in SPARC.

Unlike SPUR, SPARC does not have a user writable control register. It does have unused space (bits 19:14) in the processor status register, however, (bits 19:14) which can be used for the purpose of defining a user trap enable bit 13. Extending the privileged instructions RDPSR and WRPSR to allow the user to read and write only the condition codes and user trap enable, the user can control traps and easily emulate instructions that set condition codes.

Employing the present invention, the 108 instructions from SPARC's tag trap handler are reduced to fourteen as follows:

```
    /* Get trap information */
    rd %opcode,%OPCODE_REG
    rd %op1,%OP1_REG
    rd %op2,%OP2_REG
    rd %dest,%DEST_REG
    rd %psr, %PSR_REG
    /* Enable user traps */
    or %PSR_REG,UTRAP_ENABLE,%TEMP_REG
    wr %TEMP_REG,%psr
    /* Begin trap handler */
        .
        .
        .
    /* Go back to user program */
        /* get current pc */
    L1 call L2
    sll %DEST_REG,2,%DEST_REG
    L2 add %o7,%DEST_REG,%o7
    jmpl        [%o7 + (table − L1)],%0
    wr          %PSR_REG,%psr
        .
        .
    table
    jmpl        %NEXT_PC_REG,%0
    restore     %DEST_REG,0,%0
    jmpl        %NEXT_PC_REG,%0
    restore     %DESST_REG,0,%1
        .
        .
```

The first portion of the handler picks up the trap information, enables user traps, and enters the handler requiring seven instructions. The return portion uses the destination register number as an index into a table of jmpl_restore pairs that return the emulated result, restore the window, and continue execution at the next instruction requiring an additional seven instructions for a total overhead of 14 instructions.

The hardware cost of implementing the changes on a SPARC machine varies with the version being used. The 20,000 transistor limit of the original gate array architecture makes it difficult to justify using the additional transistors needed to implement the present invention. On more recent VLSI SPARC architectures, however, the modifications should approximate the minimal hardware expense on SPUR machines.

While the preferred embodiment of the present invention has been discussed in the context of two specific implementations on RISC architecture computers, it is to be understood that the present invention is to be limited only by the following claims. It also should be apparent that modifications and changes can be made to the present invention without departing from the spirit and scope of the present invention as defined by the following claims.

I claim:

1. An apparatus for using a value from a trap handler in a computer system invoked by a trap caused by execution of an instruction, wherein said trap handler includes a value return instruction indicating the value and a destination of the value, comprising:
- a source register set for storing said value,
- a destination register set, and
- a multiplexor selectively operative to transfer said value from said source register set to said destination register set; wherein said value is a result from said trap handler emulating said value return instruction and said value is transferred from said source register set to said destination register set by the execution of said value return instruction.

2. The apparatus for using a value from a trap handler in a computer system as defined in claim 1, wherein said multiplexor accepts as input a first value to be moved from said source register set to said destination register set and a second value in said source register set identifying a register in said destination register set to which said first value is to be transferred.

3. The apparatus for using a value from a trap handler in a computer system as defined in claim 2, wherein the value to be transferred to said register is determined from at least one value selected from the group consisting of the instruction, the source register set and the destination register set.

4. The apparatus for using a value from a trap handler in a computer system as defined in claim 1, wherein said source and destination register sets comprise a single register set divided into source and destination register windows.

5. The apparatus for using a value from a trap handler in a computer system of claim 1, wherein said value return instruction is operable to execute after a control transfer instruction of said computer system.

6. The apparatus for using a value from a trap handler in a computer system of claim 5, wherein said control transfer instruction transfers control from said trap handler to a program executing when said trap occurred.

7. A method for using an emulated result from a trap handler invoked from a trapping instruction in a program within a computer system comprising the steps of:
- determining a first argument value to be moved from a source register set to a destination register set;
- determining a second argument value in said source register set identifying a register of the destination register set to which said first argument value is to be moved;
- executing an instruction to transfer control back to said program; and using said first argument value and said second argument value in a value return instruction, wherein said value return instruction causes moving of said first argument value from said source register set into said register of said destination register set.

8. The method as defined in claim 7, wherein said method further comprises the step of changing a normally addressed register set from said source register set to said destination register set.

9. The method as defined in claim 7, wherein said method further comprises the step of determining said second argument value from multiple values selected from the group consisting of said trapping instruction, said source register set and said destination register set.

10. The method as defined in claim 9, wherein said method further comprises the step of changing the normally addressed register set from said source register set to said destination register set.

11. The method of claim 7, wherein said method further comprises the method step of executing said value return instruction in a delay slot of said instruction to transfer control.

12. An instruction sequence for execution by a trap handler in a computer system, for using an emulated result from said trap handler to a trapped program, comprising:
- a first instruction for causing the transfer of control from said trap handler to said trapped program;
- a second instruction comprising:
- a value operand; and
- a destination operand; and
- wherein said value operand indicates a register including said emulated result, and wherein said destination operand indicates the destination register of an instruction causing a trap invoking said trap handler, and wherein said second instruction causes the transfer of said value operand into said destination register and executes in a delay slot of said first instruction.

13. A method for using an emulated result from a trap from a trapping instruction in a computer system, comprising the steps of:
- executing a first instruction having a delay slot to transfer control to a second instruction immediately following said trapping instruction; and
- executing a third instruction in said delay slot for storing said emulated result into a result register of said computer system.

* * * * *